United States Patent
Mullican et al.

(10) Patent No.: US 7,500,688 B2
(45) Date of Patent: Mar. 10, 2009

(54) AIR SPRING/COIL SPRING COMBINATION SUSPENSION SYSTEM

(75) Inventors: Vernon Jeffrey Mullican, Visalia, CA (US); Raymond Charles Rawn, Clovis, CA (US)

(73) Assignee: TLC Suspensions, LLC, Los Angeles, CA (US)

( * ) Notice: Subject to any disclaimer, the term of this patent is extended or adjusted under 35 U.S.C. 154(b) by 255 days.

(21) Appl. No.: 11/349,262

(22) Filed: Feb. 8, 2006

(65) Prior Publication Data

US 2006/0175789 A1   Aug. 10, 2006

Related U.S. Application Data

(60) Provisional application No. 60/696,581, filed on Jul. 1, 2005, provisional application No. 60/651,177, filed on Feb. 8, 2005.

(51) Int. Cl.
   *B60G 11/58*   (2006.01)
(52) U.S. Cl. ............... 280/124.175; 267/23; 280/124.17
(58) Field of Classification Search ...............
   280/124.157–124.158, 124.162–124.165,
   280/124.17, 124.175, 124.179, 124.109;
   267/23, 39, 34, 47, 259
   See application file for complete search history.

(56) References Cited

U.S. PATENT DOCUMENTS

| 2,711,315 | A | * | 6/1955 | Mosebach | 267/64.27 |
| 2,989,301 | A | * | 6/1961 | Johannsen | 267/34 |
| 3,727,899 | A | * | 4/1973 | Pemberton | 267/34 |
| 3,966,223 | A | * | 6/1976 | Carr | 280/124.128 |
| 4,687,224 | A | * | 8/1987 | Selzer | 280/124.175 |
| 5,346,246 | A | * | 9/1994 | Lander et al. | 280/124.157 |
| 2006/0103102 | A1 | * | 5/2006 | Mullican | 280/124.162 |

* cited by examiner

*Primary Examiner*—Ruth Ilan
*Assistant Examiner*—Drew J. Brown (57) ABSTRACT

A supplemental suspension system for a vehicle having a rear axle and a leaf spring suspension system including a pair of leaf springs mounted over respective ends of the rear axle, the supplemental suspension system including a lower support member which is positioned above the rear axle, which extends between respective leaf springs of the pair of leaf springs, and which is fixedly mounted to respective leaf springs of the pair of leaf springs; and a plurality of spring assemblies which are mounted above the rear axle, each spring assembly of the plurality of spring assemblies being composed of, in combination, a coil spring and an air spring arranged around a common central axis and attached by a retainer, wherein the plurality of spring assemblies are supported by the lower support member.

18 Claims, 8 Drawing Sheets

AIR SPRING/COIL SPRING COMBINATION SUSPENSION SYSTEM

CROSS-REFERENCE TO RELATED APPLICATIONS

This Application for U.S. Letters Patent claims the benefit of the priority of Provisional Application No. 60/651,177 filed Feb. 8, 2005, and Provisional Application No. 60/696,581 filed Jul. 1, 2005, the disclosures of which are incorporated herein by reference. These Provisional Applications disclose improvements to the invention disclosed in Provisional Patent Application No. 60/629,682 filed on Nov. 18, 2004, now U.S. application Ser. No. 11/281,606 filed Nov. 18, 2005, by Vernon Jeffrey Mullican titled AIR SPRING/COIL SPRING COMBINATION SUSPENSION SYSTEM, the disclosures of which are herein incorporated by reference.

BACKGROUND OF THE INVENTION (1) Field of the Invention

This invention relates to suspension systems for vehicles. As used herein, the terms "vehicle" and "vehicles" are intended to include but not be limited to passenger cars, sport utility vehicles, pick-up trucks, commercial trucks, buses, vans, recreational vehicles, motor homes, farm equipment, and non-motorized trailers that carry horses, boats, cars and other loads.

(2) Description of the Related Art

Since the advent of vehicles, numerous suspension systems have been devised to improve the ride of the vehicle not only for the comfort of the occupants but also for maintaining the structural integrity and aesthetics of the contents by providing sufficient lift capability, vehicle stability, and improved handling. For example, motorized vehicles in use since the early 1900s have used simple leaf spring rear suspension systems as have certain non-motorized vehicles such as trailers. Indeed, a substantial number of modern vehicles including by way of example but not limitation pick-up trucks, vans, sport utility vehicles, commercial trucks, and trailers continue to use simple leaf spring rear suspension systems.

In addition to simple leaf spring rear suspension systems, air springs have long been used in various suspension systems in a variety of vehicle types. In known suspension systems employing air springs, the air springs are firmly attached to supporting members of the vehicle at the top and bottom sections of the air springs. These systems typically require very high air pressure which causes the air springs, and hence the ride, to be stiff. While systems employing air springs provide additional lift advantageous for carrying or towing heavy loads, the stiffness of the ride is generally perceived as reducing the comfort of the occupants. Thus, air spring suspension systems provide lift when heavily loaded but at the expense of the comfort of the occupants which may not be justified during operation of the vehicle without heavy loads.

Various aftermarket devices have been developed to provide increased lift capability and stability of a vehicle when carrying heavy loads. Generally, suspension systems strong enough to provide sufficient lift when loaded make the ride stiffer during unloaded operation, while suspension systems that don't interfere with unloaded operation may not be strong enough to provide sufficient lift when loaded. Additionally, there is often insufficient space in most vehicles for more than one suspension system. While some systems are quite simple and easily added to existing vehicles, others require significant modifications to the standard "original equipment manufacturer" (OEM) product and/or require complicated installation.

In Provisional Patent Application No. 60/629,682, now U.S. application Ser. No. 11/281,606 reference above, titled AIR SPRING/COIL SPRING COMBINATION SUSPENSION SYSTEM, Vernon Jeffrey Mullican disclosed a suspension system which employs a combination of pairs of springs in which each pair includes an air spring and a coil spring arranged around a common central axis.

The Mullican suspension system employs discrete platforms which rest on the rear axle of the vehicle and which support respective coil spring housings or air spring mountings depending on which type of spring of the combination is positioned proximate to the rear axle. While such systems perform satisfactorily, engineers for component manufacturers and liability insurance providers expressed concern about whether the rear axles of existing vehicles being retrofitted with the Mullican suspension system would satisfactorily carry the additional weight. Additionally, the platforms used sometimes interfere with OEM lines which often are run across the rear axle. Another practical concern is the need for multiple versions of the device requiring multiple components to fit various configurations of different vehicles, in particular, but not by way of limitation, half ton pick-up truck models with two-wheel and four-wheel drive made by different manufacturers.

Accordingly, it is an object of the present invention to provide vehicles having a leaf spring suspension system with a supplemental suspension system which improves the ride, handling, and load-carrying capabilities of the vehicle, and does not put additional stress on the rear axle of the vehicle.

It is another object of the invention to provide a supplemental suspension system for a wide range of existing vehicles which is easy to install as a substantially universal kit of parts which may be retrofitted or which may be integrated into new vehicles as an OEM product.

It is yet another object of the invention to provide a novel lower support member that provides additional support and stability to the supplemental suspension system, is stronger and easier to manufacture, and does not interfere with the factory-installed rear axle, leaf spring suspension system and other components.

It is still another object of the invention to increase the strength of the lower support member by either providing strongbacks on the side sections thereof at least on the ends thereof proximate the leaf springs or providing an embodiment of the lower support member having an I-beam construction.

It is additionally another object of the invention to mount the lower support member onto the leaf springs with a single inclination plate which accommodates a wide range of leaf spring inclinations and is easy and less costly to manufacture and use.

It is a further object of the invention to provide a novel upper support member that mounts to the vehicle's side frame members using novel frame brackets that are preferably adjustable and do not require spacers.

It is a yet a further object of the invention to provide novel frame brackets which have upper and lower frame bracket members so that the frame brackets are adjustable and may be used for a wide range of vehicles, such as, by way of illustration but not limitation, for a variety of pick-up trucks manufactured by American manufacturers, e.g., Ford, Chevrolet and Chrysler.

It is an additional further object of the invention to provide a method for improving ride and load-carrying capability of a wide range of vehicles having a leaf spring suspension by providing a supplemental suspension system including a plurality of spring assemblies supported by a novel lower support member which does not mount to and unduly stress the rear axle, and a novel upper support member which is mounted to the side frame members using novel frame brackets.

SUMMARY OF THE INVENTION

These and other objects of the invention are accomplished by providing a supplemental suspension system for a vehicle having a rear axle and a leaf spring suspension system including a pair of leaf springs mounted over respective ends of the rear axle, the supplemental suspension system comprising: a lower support member which is positioned above the rear axle, which extends between respective leaf springs of the pair of leaf springs, and which is fixedly mounted to respective leaf springs of the pair of leaf springs; and a plurality of spring assemblies which are mounted above the rear axle, each spring assembly of the plurality of spring assemblies being comprised of, in combination, a coil spring and an air spring arranged around a common central axis and attached by retainer means, wherein the plurality of spring assemblies are supported by the lower support member.

The lower support member may have a cross-section which is one of U-shaped or I-beam shaped, and wherein the lower support member comprises a longitudinal section which supports the plurality of spring assemblies, first and second longitudinal side sections, and first and second ends.

In one embodiment, the lower support member may be a bent rectangular sheet having a cross-section which is U-shaped. A plurality of pairs of strongbacks may be advantageously securely attached to the first and second longitudinal side sections of the lower support member and extend at least proximate the first and second ends thereof so that the lower support member is reinforced.

The supplemental suspension system may further comprise respective coil springs positioned above and proximate the lower support member and respective air springs positioned above the respective coil springs. Then, the supplemental suspension system may further comprise a plurality of coil spring housings which are attached to the longitudinal section of the lower support member and which receive respective coil springs of the spring assemblies.

In an alternate (flipped embodiment), the respective air springs are positioned above and proximate the lower support member and respective coil springs are positioned above the respective air springs. Then, the supplemental suspension system further comprises a plurality of air spring platforms which are attached to the longitudinal section of the lower support member and to which respective air springs of the spring assemblies are attached.

The supplemental suspension system may further comprise a plurality of lower support end brackets which fixedly mount the lower support member to respective leaf springs of the pair of leaf springs using mounting means. Then, when respective leaf springs of the pair of leaf springs are transversely mounted over respective ends of the rear axle of the vehicle using mounting means comprising a plurality of U-bolts having threaded ends, shackles, and nuts, each lower support end bracket may advantageously comprise a bent rectangular plate having a top section which is flat and extends horizontally, and through which a pair of integral bolts extend, and a pair of side sections which extend downwardly from the top section in mirror image L-shaped contours, have respective vertical leg sections and horizontal leg sections, and have respective pairs of perforations which are at least one of circular holes, elliptical holes and slots defined in the horizontal leg sections thereof. Further, the longitudinal section of the lower support member may have defined there through a plurality of slots through which respective pairs of integral bolts of the lower support end brackets are inserted and secured so that the lower support member is mounted substantially horizontally, and the threaded ends of a pair of said U-bolts may be inserted through one shackle and through one said pair of the pairs of holes defined in respective horizontal leg sections of the lower support end brackets, and secured with respective nuts.

Since respective leaf springs extend over the rear axle in a slope, advantageously the horizontal leg sections of the side sections of the lower support end brackets extend from the respective vertical top sections at differing angles but the same slope, which slope substantially parallels that of the leaf springs so that the first and second ends of the lower support member extend substantially horizontally and substantially parallel to the rear axle.

The lower support end brackets may further comprise a plurality of pairs of end bracket retainers each having defined therein a pair of holes. Then, the threaded ends of respective pairs of said U-bolts extend through a respective shackle, through the holes defined in respective horizontal leg sections of respective lower support end brackets, and through the holes defined in respective pairs of end bracket retainers, and are secured by nuts.

Additionally, the lower support end brackets may further comprise a plurality of pairs of end bracket spacers each having defined therein a pair of holes. Then, the threaded ends of respective pairs of said U-bolts extend through a respective shackle, through the holes defined in respective pairs of end bracket spacers, through the holes defined in respective horizontal leg sections of respective lower support end brackets, and through the holes defined in respective pairs of end bracket retainers, and are secured by nuts.

The supplemental suspension system may further comprise a plurality of inclination plates through which the lower support member is mounted to respective leaf springs of the pair of leaf springs using mounting means, such as bolts and nuts by way of example but not limitation. Advantageously, each inclination plate of the plurality of inclination plates comprises a bent rectangular plate having a top which is flat and extends horizontally, and which has defined therein a plurality of slots, and side legs which extend opposingly from the top in the form of the letter Z. Then, the first and second ends of the lower support member are mounted onto respective tops of the inclination plates to maintain the lower support member level, i.e., substantially parallel to the rear axle, by correcting for the slant of the leaf springs.

The lower support member may have a cross-section which is I-beam shaped. Then, the lower support member comprises a longitudinal plate which supports the plurality of spring assemblies and which has a plurality of pairs of slots defined therein, and first and second longitudinal side plates which are rigidly fixed to the longitudinal plate, and the longitudinal plate of the lower support member is mounted onto respective tops of the inclination plates.

The respective leaf springs of the pair of leaf springs are transversely mounted over respective ends of the rear axle of the vehicle using mounting means comprising a plurality of U-bolts having threaded ends and nuts. Then, the threaded ends of a pair of said U-bolts may be inserted through respective slots of the plurality of pairs of slots defined in respective tops of respective inclination plates and through respective slots of the plurality of pairs of slots defined in the lower support members, and secured with respective nuts.

Alternately, when square U-bolts are employed, the respective leaf springs of the pair of leaf springs are transversely mounted over respective ends of the rear axle of the vehicle using mounting means comprising a plurality of square U-bolts having threaded ends, shackles, and nuts. Then, the lower support member is positioned over respective inclination plates and a pair of said square U-bolts are positioned to extend over respective inclination plates and over the lower support member, and the threaded ends of said pair of square U-bolts extend beneath respective leaf springs and are secured through respective shackles and respective nuts.

The lower support member advantageously further comprise cut-outs provided in the first and second longitudinal side sections of the lower support member near the first and second ends thereof to accommodate respective inclination plates and, when present, in respective pairs of strongbacks near the first and second ends of the lower support member.

The vehicle has side frame members and a vehicle bed, and the supplemental suspension system may further comprise an upper support member and a pair of Z-brackets attached to the ends of the upper support member. The upper support member then extends parallel to the rear axle, is positioned below the vehicle bed, and is fixedly attached to respective side frame members by respective ones of the pair of Z-brackets. Thus, the common central axis of respective spring assemblies is maintained by support from below by the lower support member and from above by the upper support member.

The pair of Z-brackets may advantageously each comprise upper and lower frame brackets which have defined therein a plurality of adjustment perforations including at least one of holes and slots, and which engage each other and are fixedly connected by attachment means. Then, respective lower frame brackets are fixedly mounted to respective side frame members of the vehicle and respective upper frame brackets are fixedly mounted to the upper support member so that the upper support member is held in place underneath the vehicle bed.

These and other objects of the invention are accomplished by providing a supplemental suspension system for a vehicle having a rear axle and a suspension system including a pair of leaf springs mounted over respective ends of the rear axle, which is a kit of parts in a packing container, comprising, in use, a lower support member which is positioned above the rear axle, which extends between respective leaf springs of the pair of leaf springs, and which is fixedly mounted to respective leaf springs of the pair of leaf springs; and a plurality of spring assemblies which are mounted above the rear axle, each spring assembly of the plurality of spring assemblies being comprised of, in combination, a coil spring and an air spring arranged around a common central axis and attached by retainer means, wherein the plurality of spring assemblies are supported by the lower support member.

These and other objects of the invention are accomplished by providing a method for improving ride, handling, and load-carrying capability of a vehicle. A vehicle is provided having opposing side frame members, a rear axle and a leaf spring suspension with a supplemental suspension system comprised of a plurality of spring assemblies, each spring assembly of the plurality of spring assemblies comprising, in combination, a coil spring attached to an air spring arranged around a common central axis and attached by retainer means, which is mounted above the rear axle of the vehicle; an upper support member which extends between the opposing side frame members, which is attached thereto using Z-brackets, and which supports one of the air spring or the coil spring of respective spring assemblies; and a lower support member which is positioned above the rear axle, which extends between respective leaf springs of the pair of leaf springs, which is fixedly mounted to the respective leaf springs, and which supports one of the air spring or the coil spring of respective spring assemblies. Respective air springs of the plurality of spring assemblies may be partially inflated thereby causing respective coil springs of the plurality of spring assemblies to partially collapse into their housings when improvement to the ride is desired in combination with improvement in load-carrying ability. Finally, respective air springs of the plurality of spring assemblies may be completely inflated thereby causing respective coil springs of the plurality of spring assemblies to substantially completely collapse into their housings when improvement in the ride and maximum load-carrying ability are desired.

DETAILED DESCRIPTION OF THE INVENTION

Figure 1:
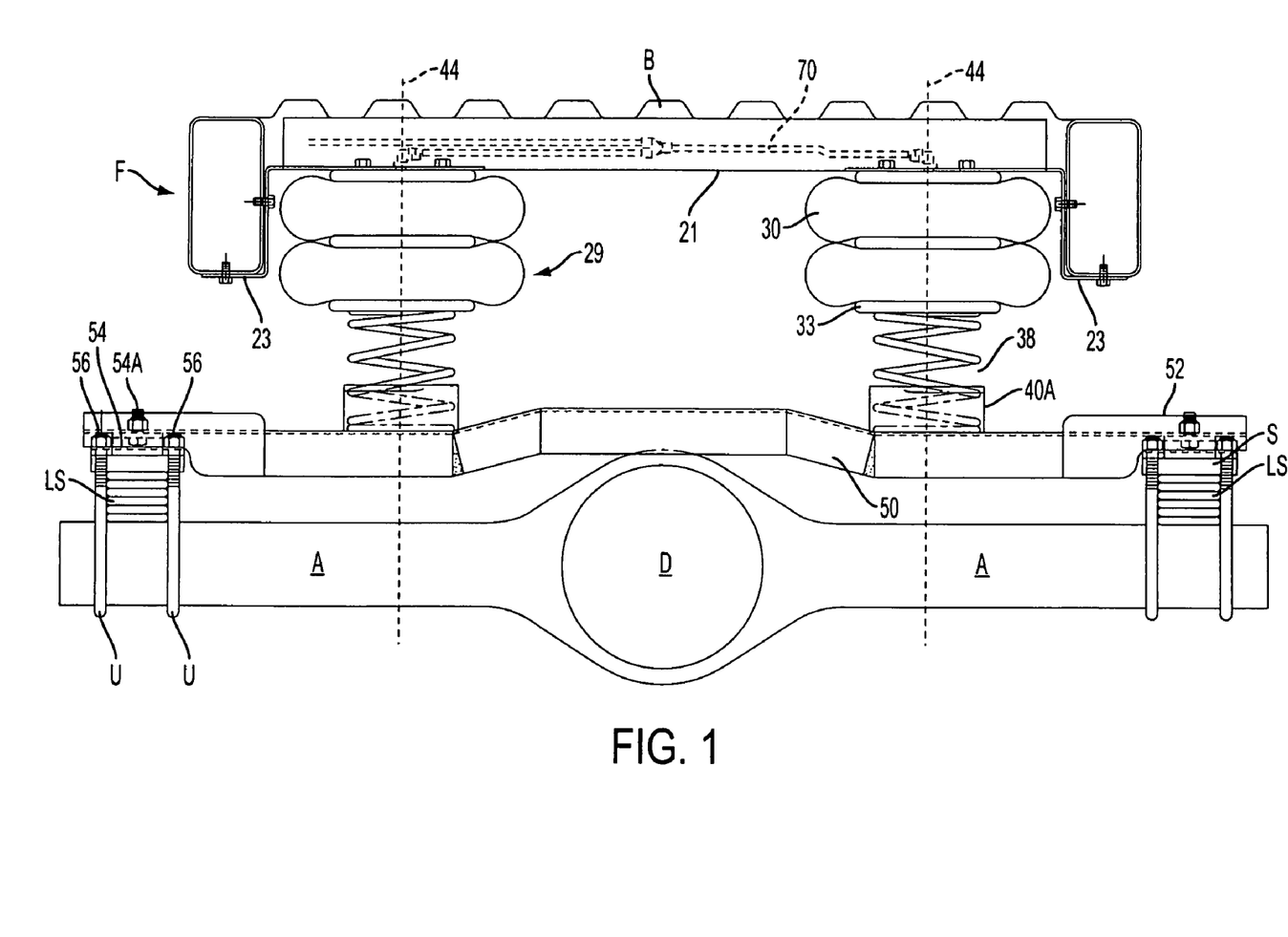
FIG. 1 is an elevational rear view of a vehicle showing coil and air springs supported on a lower support member according to the invention which is positioned above the rear axle and which is fixedly mounted onto respective leaf springs using end brackets and U-bolts.
Figure 4:
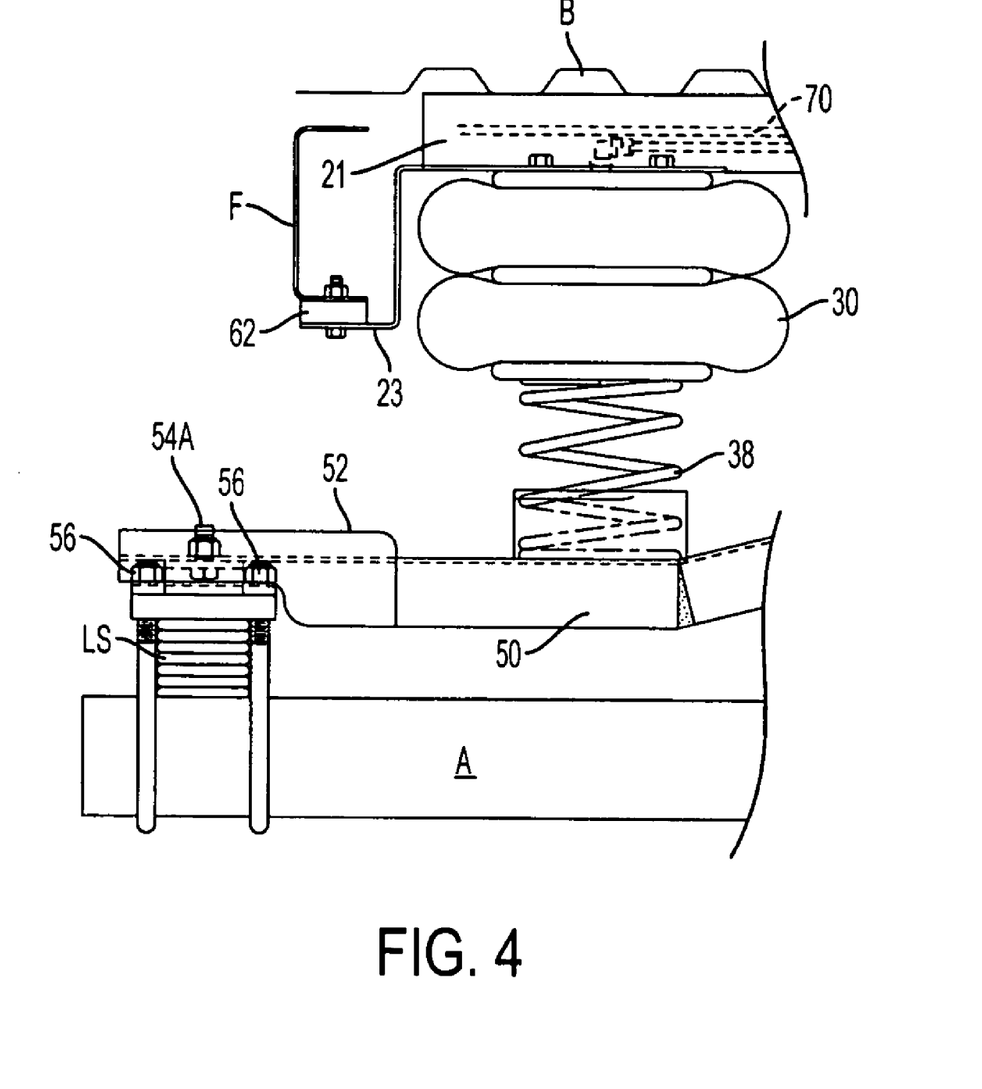
FIG. 4 is a partial elevational rear view of a vehicle showing an upper support member and an upper support bracket according to the invention in relation to an air spring.

With reference to FIG. 1 herein, the present improvement to the prior Mullican invention provides a lower support member 50 that is positioned above rear axle A but does not touch it or come to rest upon it. Instead, lower support member 50 is attached on top of existing leaf springs LS using a lower support end bracket 54 in conjunction with the same OEM U-bolt U, shackles S, and nuts 56, and optionally pads and/or spacers, that attach leaf spring LS to the vehicle's chassis and frame. While FIGS. 1 and 4 show the leaf springs LS occupying completely the space between rear axle A and shackle S, some manufactures supply pads and/or spacers on top of rear axles. Thus, FIGS. 2A, 8, 9, and 11 show a gap between the rear axle and the leaf spring which could be occupied by a pad and/or spacer, but which have not been shown in these figures. Indeed, FIG. 7A does not show the leaf springs or any pads and/or spacers in order to keep this figure simple. As used herein, the term "shackles" is intended to include parts alternately referred to as leaf spring retainer brackets by some manufacturers.

With reference to FIG. 1, coil spring housings 40A are attached to lower support member 50 such as by welding so that coil springs 38 are placed inside and retained by them. In an alternate (flipped) embodiment shown in FIG. 11, coil spring housing 40a is attached to the upper support member 21 and air spring 30 is attached via attachment plate 33 to air spring platform 22B which rests on the top section 50C' of lower support member 50'. Drainage holes may be provided in lower support member 50 in the center of the coil spring housings 40a to minimize rusting. Air spring platform 22B may be a can, i.e., a cylinder with a top having a diameter suitable to the size of the respective springs.

Figure 5A:
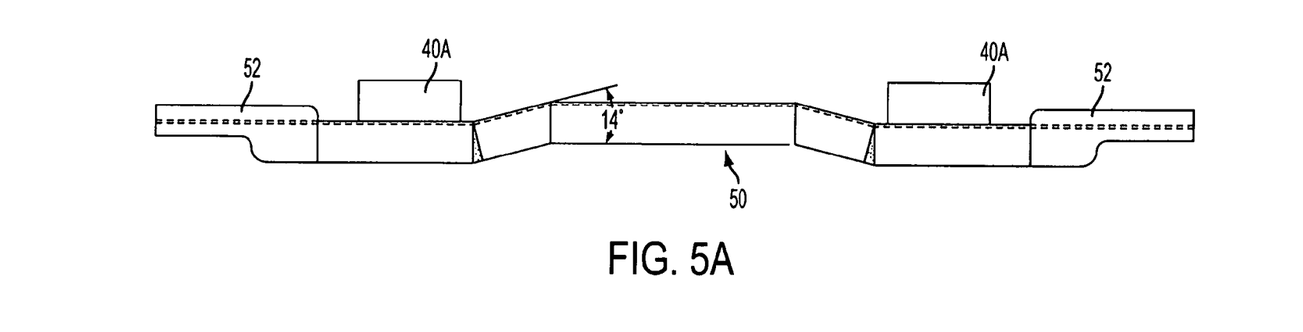
FIG. 5A is a side view of a lower support member, strongbacks and a coil spring housing according to the invention.
Figure 5B:
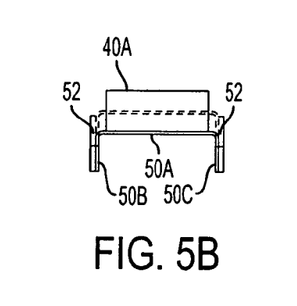
FIG. 5B is an end view of the lower support member of FIG. 5A showing the positioning of strongbacks according to the invention.
Figure 6:
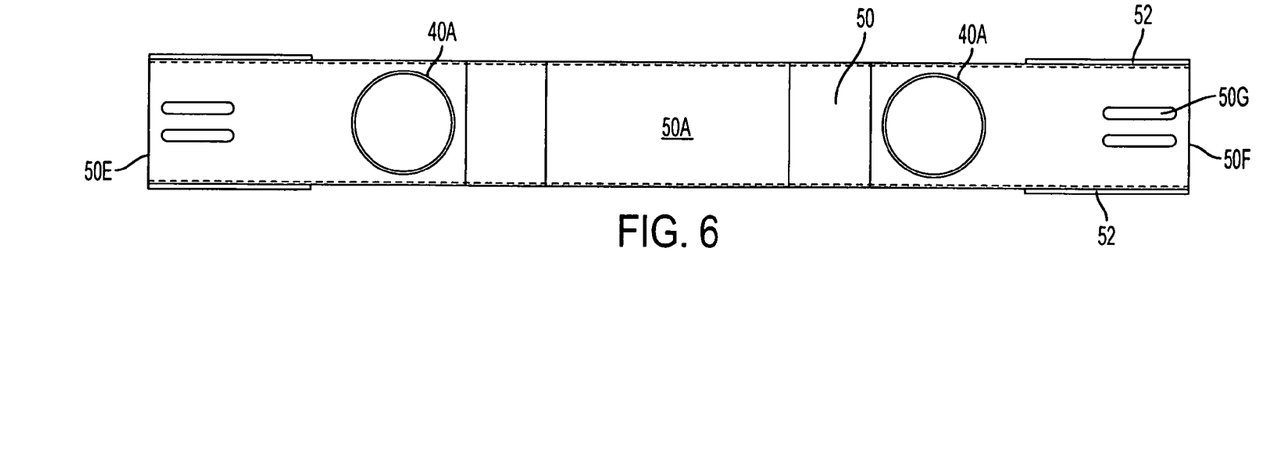
FIG. 6 is a top view of the lower support member of FIG. 5A.

With reference to the embodiment shown in FIGS. 5A, 5B, and 6, lower support member 50 is comprised of a rectangular metal sheet which has been bent on two sides to form a U-channel of considerable strength. Lower support member 50 is fabricated to provide a hump in its center as shown in FIG. 5A so that it does not interfere with the vehicle's rear axle A or, in vehicle's having a straight rear axle, with differential housing D present on such. Cuts are made to achieve the elevation desired and these are then welded in place.

As shown in FIG. 6, lower support member 50 has a longitudinal section 50a with first and second ends 50E, 50F. In this embodiment, pairs of strongbacks 52 are fixedly attached, such as by welding, proximate to the first and second ends of lower support member 50 for additional strength. Lower support member 50 has defined therein a plurality of pairs of slots so that it is adjustable and fits a wide range of vehicles including but not limited to a substantial number of half ton pick-up trucks manufactured in the United States in the last thirty years.

Strongbacks 52 are shown in FIGS. 5A, 5B, and 6. These reinforce the lower support member 50 and are attached, for example by way of illustration but not limitation by welding, to first and second sides sections of lower support member 50. When air springs 30 are inflated and come to rest on top of coil spring housing 40A, strongbacks 52 provide additional support and stability for respective spring assemblies each comprising an air spring 30 and a coil spring 38, and for lower support member 50 as it is put into mechanically contact with side frame members F above it. Strongbacks 52 also strengthen lower support member 50 generally.

FIGS. 7A, 8, 9, and 11 show another embodiment of a lower support member 50' comprised of a longitudinal plate 50C', first and second longitudinal side plates 50A' and 50B', and first and second ends 50E', 50F'. In this embodiment, the longitudinal side plates 50A', 50B' extend the entire length of lower support member 50' forming a cross-section having a shape of an I-beam. First and second longitudinal side plates 50A' and 50B' are made of metal such as $5/16"$ steel.

Figure 10:
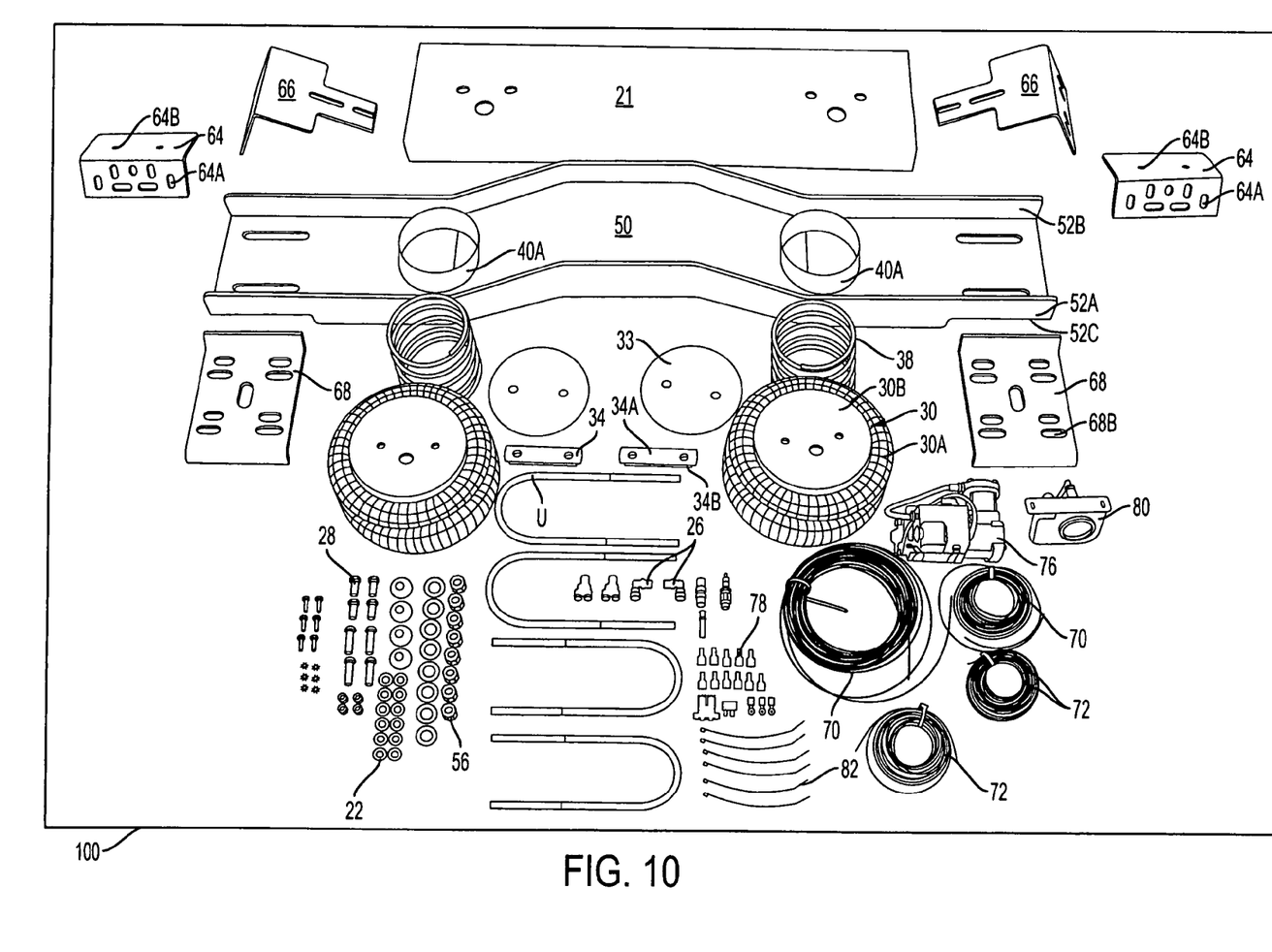
FIG. 10 is a kit of parts in a container of the supplemental suspension system of the invention.

To accommodate inclination plate 68, cut outs 52C' may be made in the first and second longitudinal side plates 50A' and 50B' of the I-beam embodiment shown in FIG. 10. Similarly, portion of the strongbacks 52 may be cut out near the ends of lower support member 50 as shown in FIG. 5A so that it accommodates inclination plate 68.

Figure 2A:
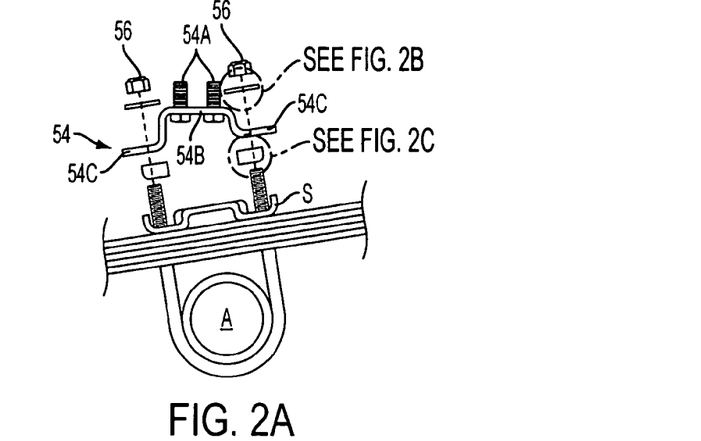
FIG. 2A is a partial side view showing an end bracket with bracket spacers and bracket retainers according to the invention shown in FIG. 1, for fixedly mounting the lower support member onto a leaf spring using a U-bolt and shackle.

With reference to FIG. 2A, lower support end bracket 54 is mounted proximate leaf spring LS and a pair of such brackets is used to hold lower support member 50 (not shown in this view) in place. Each lower support end bracket 54 comprises a bent rectangular plate having a top section 54b which is flat and through which a pair of integral bolts 54a extend and are fixed thereto, such as by welding, and a pair of side sections 54c which extend downwardly in mirror image L-shaped contours, have respective vertical leg sections and horizontal leg sections, and have defined in the extremities thereof respective pairs of perforations 54d which are one of circular holes, elliptical holes or slots.

Lower support end brackets 54 fixedly attach the lower support member 50 to respective leaf springs LS using U-bolts U and shackles S with nuts 56. Preferably the U-bolts, shackles and nuts are the same ones provided by the manufacturer for mounting the leaf springs to the rear axle.

Lower support end bracket 54 is designed to take into account the shape and angle of the vehicle's particular leaf spring assembly since the pair of side sections extend substantially parallel to the leaf springs. This is accomplished by fabricating the pair of side sections 54C to have extremities, i.e., horizontal leg sections, having a slope, measured with the top section 54B as a reference, which is approximately the same as that of the leaf springs, as an example by way of illustration but not limitation, 9°. In this example, this slope is obtained by providing the pair of side sections with respective internal angles of 90° and 99°. Lower support end brackets 54 for other vehicles would be configured to the exact geometry and configuration of the leaf spring, axle, chassis and frame of each vehicle.

Figure 2B:
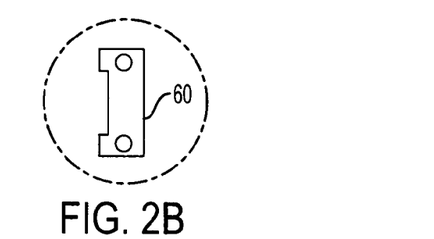
FIG. 2B is an enlarged view of the bracket retainer of FIG. 2A.
Figure 2C:
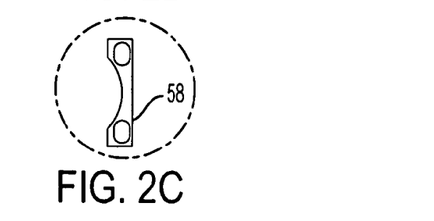
FIG. 2C is an enlarged view of the bracket spacer of FIG. 2A.
Figure 3:
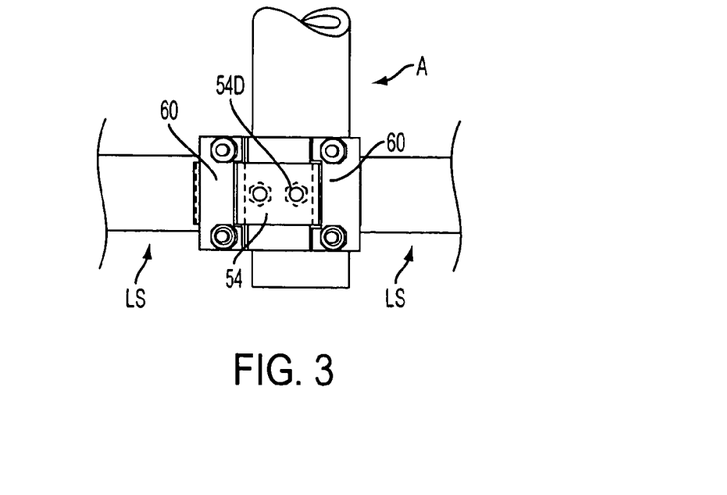
FIG. 3 is a partial top view of the end bracket of FIG. 2 showing bracket retainers after assembly.

In Dodge and Ford half ton pick-up trucks, bracket spacers 58 and bracket retainers 60 (shown in FIGS. 2B and 2C, respectively) are used to support and anchor lower support end bracket 54. On Chevrolet half ton pick-up trucks, bracket spacers 58 are not used because they are not needed. Lower support end bracket 54 is held in place by loosening existing U-bolts U, inserting bracket spacers 58 (when needed), inserting lower support end bracket 54, inserting bracket retainers 60, and using nuts 56 to tighten the U-bolts U A top view of the assembly is shown in FIG. 3.

To facilitate the design flexibility of the assembly, the longitudinal top section 50A of the lower support member 50 has defined there through a plurality of slots 50G through which respective pairs of integral bolts 54A of the lower support end brackets 54 are inserted and secured. Then, the threaded ends of a pair of said U-bolts U are inserted through one shackle S and through one pair of the pairs of perforations 54D defined in respective horizontal leg sections of the side sections 54C of the lower support end brackets 54, and secured with respective nuts 56.

With reference to FIG. 4, one end of upper support member 21 is shown securely mounted to one side frame member F of the vehicle directly over the rear axle A using an upper support bracket 23 which has a Z-shape and is made by bending a rectangular sheet of metal into a Z-shape. The other end of upper support member 21 is similarly mounted (not shown).

Spacers 62 are shown and serve to bridge any spatial gap between the side frame member F and the upper support bracket 23 which may exist on some vehicles. Spacers 62 may be discrete washers or a rectangular block having dimensions appropriate to the width of the support bracket 23 and having mounting holes defined therein. Air lines 70 for pressurizing air springs 30 are additionally shown in FIG. 4. The air lines 70 may be pressurized via fittings 26 at a filling station or by an on board compressor (not shown) for which an electrical switch 76 and pressure gauge 80 (see FIG. 10) may be mounted on the dash board of the vehicle.

Upper support member 21 is connected to upper support brackets 23 such as by nuts and bolts in pre-drilled holes. Upper support member 21 rests on the underneath side of the vehicle directly over the rear axle. Various holes 23a defined in upper support brackets 23 allow the upper support brackets 23 to be adjusted and be useful on various vehicles including a substantial number of the half ton pick-up trucks manufactured in the United States in the last thirty years.

Figure 8:
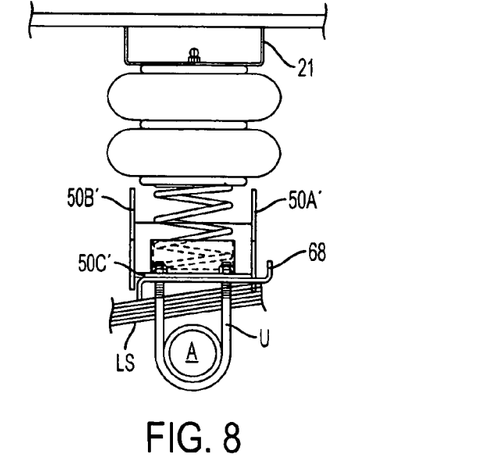
FIG. 8 is a partial side view showing an inclination plate according to the invention for supporting the lower support member on top of the leaf springs.
Figure 9:
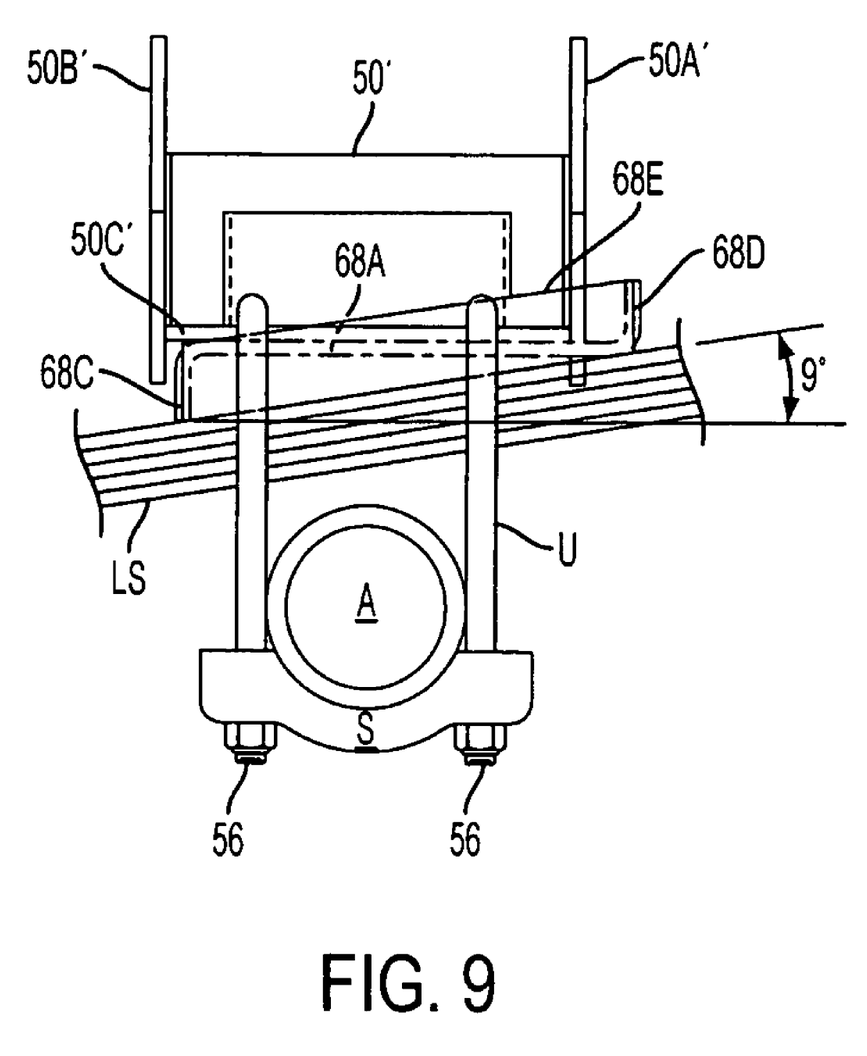
FIG. 9 is a partial side view showing another embodiment in which the inclination plate is attached to the leaf springs using square U-bolts, shackles and nuts, such as may be used for Chevrolet and GMC ½-ton pick-up trucks, and other vehicles.

With reference to FIGS. 8 and 9, an inclination plate 68 is positioned on top of leaf springs LS and below lower support member 50 at each end thereof at each end of rear axle A. Inclination plate 68 comprises a top 68A and side legs 68C, 68D which may have differing lengths. Lower support member 50 is held in place by the use of one of factory U-bolts U or longer U-bolts U with inclination plate 68 positioned under the lower support member 50 at each end thereof and above leaf springs LS. Inclination plate 68 is made of metal such as 10 gauge steel.

FIG. 9 shows a gusset 68E welded on one end of each inclination plate 68 for additional stability against bending. This gusset has a polygon shape extending between side legs 68C and 68D from the lowermost end of 68C up to the uppermost end of 68D.

Inclination plate 68 is positioned with the shorter leg thereof (e.g., 68D in FIG. 9) facing the front of a vehicle wherein there is a 9 degree angle between horizontal and the angle of leaf springs LS such as in the case of Ford, Chevrolet and General Motors Corporation pick-up trucks and other vehicles as shown in FIG. 9. Inclination plate 68 is positioned with the longer leg thereof facing the front of vehicles wherein there is a 6.5 degree angle between horizontal and the angle of leaf springs LS such as in the case of Dodge pick-up trucks and other vehicles (not shown).

Figure 11:
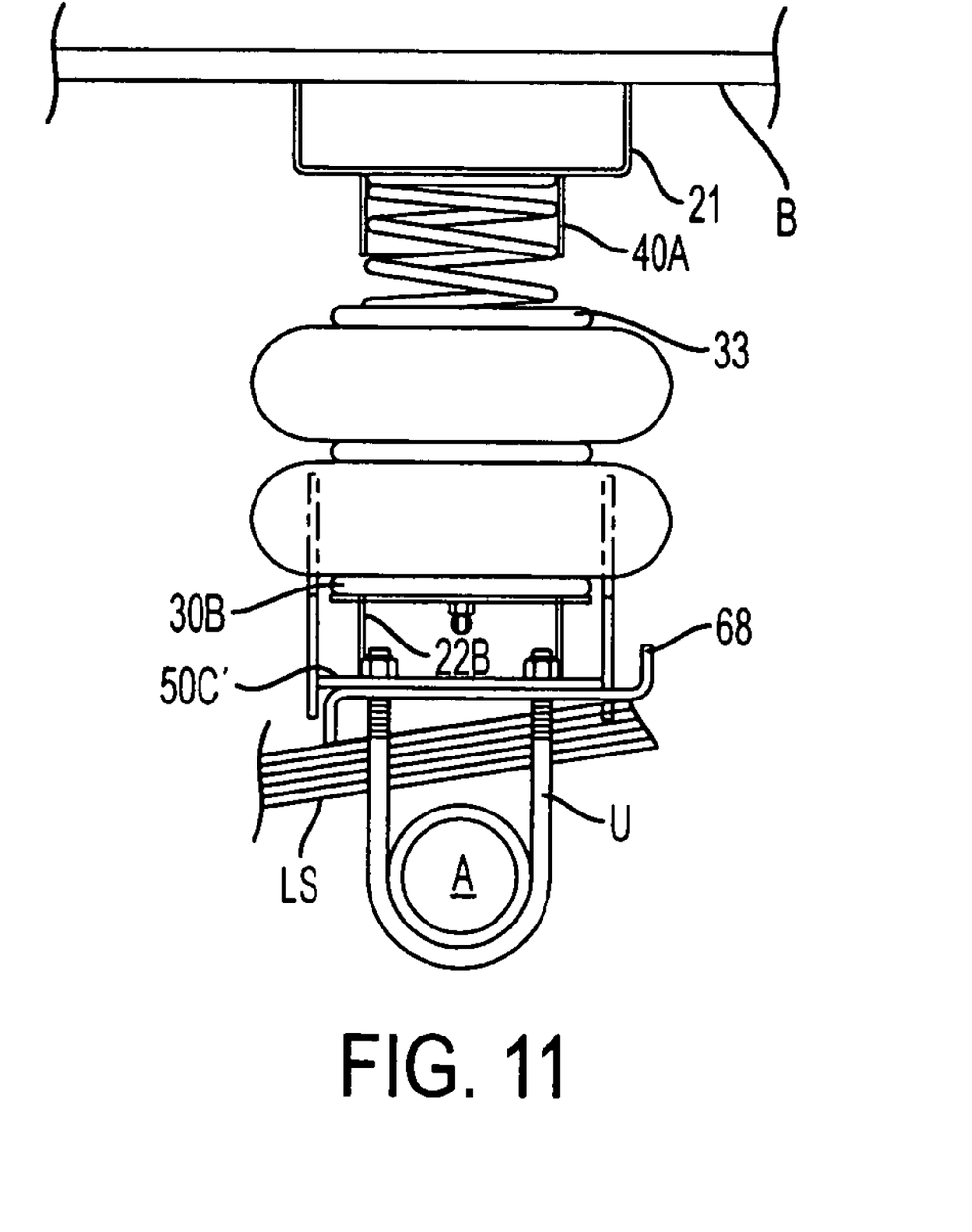
FIG. 11 is a partial side view showing an inclination plate according to the invention for supporting the lower support member on top of the leaf springs in an alternate embodiment of the spring assemblies in which the coil spring is mounted above the air spring instead of the orientation shown in FIG. 8.

The exact shape and dimensions of inclination plate 68 are designed to take into account the shape and angle of the vehicle's particular leaf spring LS assembly. The side legs 68C, 68D of inclination plates 68 preferably have different lengths bent at 90 degree angles as shown in FIGS. 8, 9, and 11 for American half ton pick-up trucks. Inclination plates 68 for other vehicles would be configured based on the exact geometry and configuration of the leaf spring LS, rear axle A, chassis and side frame members F of each vehicle.

FIG. 8 shows an advantageous embodiment of the present invention configured for Ford half ton pick-up trucks. The configuration for Dodge half ton pick-up trucks is similar but an angle of 6.5° is used instead of the 9° as discussed above. FIG. 9 shows an advantageous embodiment of the present invention configured for Chevrolet and GMC half ton pick-up trucks.

FIG. 10 shows coil spring retainers 34 for retaining the coil springs in juxtaposition to attachment plate 33 and ultimately to air spring (see FIG. 1). Each retainer 34 of this coil spring retainer embodiment features two rectangular plates that have been welded together to define side notches on their short ends into which an end section of a respective coil spring 38 may be positioned for the purpose of retaining the coil spring 38 in position against the attachment plate 33. Coil spring retainer 34 include a first plate 34A which is a rectangular plate of metal and a second plate 34B which is a rectangular plate of metal which has a length which is less than that of the first plate 34A. Alternate coil spring retainer embodiments are disclosed in the earlier Mullican Application referenced herein.

With reference to FIG. 1, upper support member 21 extends parallel to the rear axle A and is positioned below the vehicle bed B. A pair of Z-brackets 23 are attached to the ends of the upper support member 21 and are fixedly attached to respective side frame members F. This serves to maintained the common central axis alignment of respective spring assemblies 29 by providing support from below from the lower support member 50 and from above by the upper support member 21.

Figure 7A:
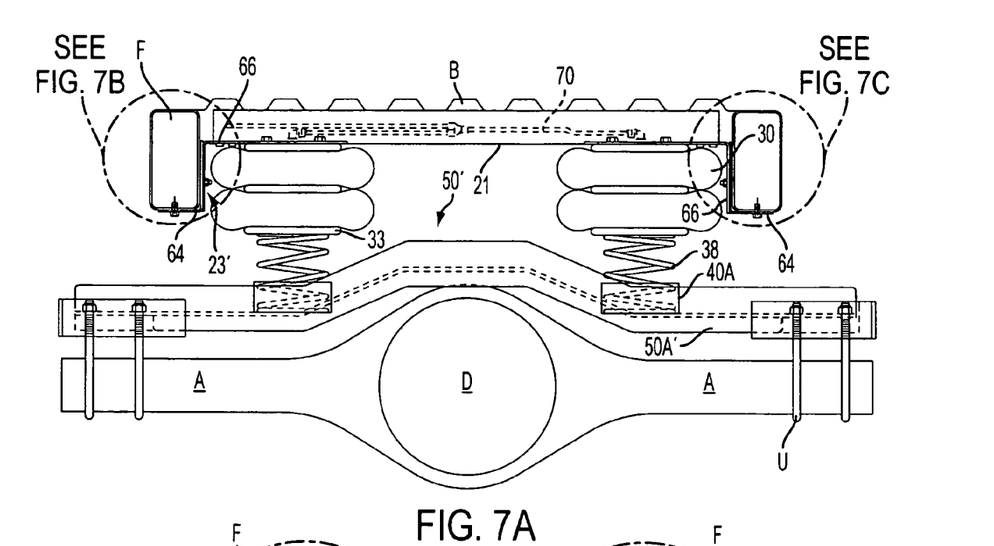
FIG. 7A is an elevational rear view of a vehicle showing an upper support member and upper support frame brackets, i.e., Z-brackets, according to the invention for mounting the upper support member to the vehicle's frame and onto which the air spring is attached.
Figure 7B:
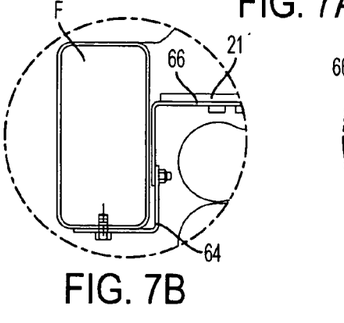
FIGS. 7B and 7C are enlarged views of the two-piece Z-brackets of FIG. 7A.
Figure 7C:
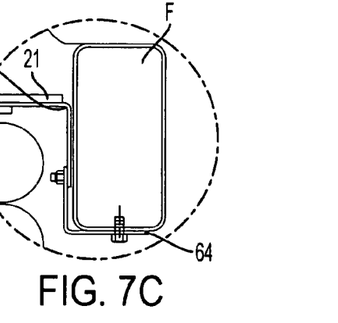

The upper support brackets 23 shown in FIG. 4 are each one piece Z-brackets 23. FIG. 7A shows an advantageous variant which is are two piece Z-brackets 23' each having lower frame bracket 64 and upper frame bracket 66 joined by attachment means. Thus, lower frame brackets 64 and upper frame brackets 66 have a plurality of perforations for attachment and adjustment flexibility which may be holes 64A and/or slots 64B as shown in FIG. 10. Respective lower frame brackets 64 are fixedly mounted to respective side frame members F of the vehicle such as with bolt 28 and nut 56 in slots in lower frame bracket 64 directly adjacent and above rear axle A on each end thereof as shown in FIG. 7. Respective upper and lower frame brackets 64, 66 engage each other and are fixedly connected by attachment means, such as by nuts and bolts in pre-drilled holes and/or slots. Respective upper frame brackets 66 are fixedly mounted to the upper support member 21, such as by nuts and bolts in pre-drilled holes, so that the upper support member 21 is held in place underneath the vehicle bed B.

The various holes and slots in upper support member 21, lower frame bracket 64, and upper frame bracket 66 are useful so that the unit can be installed on various vehicles, depending on the width and location of various holes, including a substantial number of the half ton pick-up trucks manufactured in the United States in the last thirty years. Elliptical cut-outs can be made in the lower support member 50 where the coil spring housings 40a are positioned to allow for drainage and for other useful purposes.

Upper support member 21 is shown in FIGS. 1, 4, and 7, and may be made of metal such as 10 gauge steel. The coil spring retainer assembly 34 is comprised of upper coil spring retainer 34A and lower coil spring retainer 34B, and may be made of metal such as 10 gauge steel. The attachment plate may be a single attachment plate 33 and is made of metal such as 10 gauge steel. The coil spring housing 40a shown in FIGS. 1 and 7 may be made of metal such as 10 gauge steel. The lower frame bracket 64 shown in FIGS. 1 and 7 may be made of metal such as 10 gauge steel. The upper frame bracket 66 shown in FIGS. 1 and 7 may be made of metal such as 10 gauge steel. The strongbacks 52 shown in FIGS. 5A and 5B may be made of metal such as ⁵⁄₁₆" steel. The lower support member 50 shown in FIGS. 1 and 7 may be made of metal such as ¼' steel.

The present invention is intended as a retro-fit for existing vehicles. While this device fits most American-made half ton pick-up trucks, it can be useful in other vehicles by changing the dimensions and shapes of the parts based on the exact dimensions, weight and carry capacity of the vehicle. The invention can also be incorporated into new vehicles and determining the exact configuration and size of various pieces required for the particular vehicle and separate pieces provided herein could be incorporated into one of at least the vehicle frame, chassis and body.

While the present invention has been described in conjunction with preferred embodiments and variations thereof, one of ordinary skill after reviewing the foregoing specification will be able to effect various changes, substitutions of equivalents and other alterations without departing from the broad concepts disclosed herein. It is therefore intended that Letters Patent granted hereon be limited only by the definition contained in the appended claims and equivalents thereof.

REFERENCE NUMERALS IN DRAWINGS

21 Upper Support Member
22B Air Spring Platform
23 Upper Support Brackets
23A Holes
26 Air Line Fittings
28 Bolts
29 Spring Assemblies
30 Air Spring
33 Single Attachment Plate
34 Coil Spring Retainer Assembly
34A First Plate
34B Second Plate
38 Coil Spring
40a Coil Spring Housing
50, 50' Lower Support Member
50A, 50A' Longitudinal Top Section
50B', 50C" First and Second Longitudinal Side Sections
50D Slots
50E, 50F First and Second Ends
52 Strongbacks
54 Lower Support End Brackets
54A Integral Bolts
54B Top Section
54C Pair of Side Sections
54D Perforations (holes and/or slots)
54E Vertical Leg Sections
54F Horizontal Leg Sections
56 Nuts
58 Bracket Spacer
60 Bracket Retainers
62 Frame Spacers
66 Lower Frame Brackets
64A Slots
64B Holes
66 Upper Frame Brackets
68 Inclination Plates
68A Top
68B Slots
68C, 68D Side Legs
70 Air Lines
72 Connecting Wiring
74 Mounting Hardware
76 Electrical Switch
78 Electrical Terminals
80 Pressure Gauge
82 Straps
100 Kit Container
A Rear Axle
B Bed of Vehicle
D Differential
F Side Frame members
LS Leaf Spring
S Shackles
U U-bolts

What is claimed is:

1. A supplemental suspension system for a vehicle having a rear axle and a leaf spring suspension system including a pair of leaf springs mounted over respective ends of the rear axle, the supplemental suspension system comprising:
a lower support member which is positioned above the rear axle, which extends between respective leaf springs of the pair of leaf springs, and which is fixedly mounted to respective leaf springs of the pair of leaf springs; and
a plurality of spring assemblies which are mounted above the rear axle, each spring assembly of the plurality of spring assemblies being comprised of, in combination, a coil spring and an air spring arranged around a common central axis and attached by retainer means, wherein the plurality of spring assemblies are supported by the lower support member.

2. The supplemental suspension system according to claim 1, wherein the lower support member has a cross-section which is one of U-shaped or I-beam shaped, and wherein the lower support member comprises first and second longitudinal side sections, first and second ends, and a longitudinal section which supports the plurality of spring assemblies.

3. The supplemental suspension system according to claim 2, wherein the lower support member is a bent rectangular sheet having a cross-section which is U-shaped and further comprises a plurality of pairs of strongbacks for reinforcement which are securely attached to the first and second longitudinal side sections and extend at least proximate the first and second ends of the lower support member.

4. The supplemental suspension system according to claim 2, wherein respective coil springs are positioned above and proximate the lower support member and respective air springs are positioned above the respective coil springs, and wherein the supplemental suspension system further comprises a plurality of coil spring housings which are attached to the longitudinal section of the lower support member and which receive respective coil springs of the spring assemblies.

5. The supplemental suspension system according to claim 2, wherein respective air springs are positioned above and proximate the lower support member and respective coil springs are positioned above the respective air springs, and wherein the supplemental suspension system further comprises a plurality of air spring platforms which are attached to the longitudinal section of the lower support member and to which respective air springs of the spring assemblies are attached.

6. The supplemental suspension system according to claim 2, further comprising a plurality of lower support end brackets which fixedly mount the lower support member to respective leaf springs of the pair of leaf springs using mounting means.

7. The supplemental suspension system according to claim 6, wherein respective leaf springs of the pair of leaf springs are transversely mounted over respective ends of the rear axle of the vehicle using mounting means comprising a plurality of U-bolts having threaded ends, shackles, and nuts, wherein each lower support end bracket comprises a bent rectangular plate having a top section which is flat and extends horizontally, and through which a pair of integral bolts extend, and side sections which extend downwardly from the top section in mirror image L-shaped contours, have respective vertical leg sections and horizontal leg sections, and have respective pairs of perforations which are at least one of circular holes, elliptical holes and slots defined in the horizontal leg sections thereof, wherein the longitudinal section of the lower support member has defined there through a plurality of slots through which respective pairs of integral bolts of the lower support end brackets are inserted and secured so that the lower support member is mounted substantially horizontally, and wherein the threaded ends of a pair of said U-bolts are inserted through one shackle and through one said pair of the pairs of holes defined in respective horizontal leg sections of the lower support end brackets, and secured with respective nuts.

8. The supplemental suspension system according to claim 7, wherein the horizontal leg sections of the side sections of the lower support end brackets extend from the respective vertical top sections at differing angles but the same slope, which slope substantially parallels that of the leaf springs so that the first and second ends of the lower support member extend substantially horizontally and substantially parallel to the rear axle.

9. The supplemental suspension system according to claim 7, further comprising a plurality of pairs of end bracket retainers each having defined therein a pair of holes, and wherein the threaded ends of respective pairs of said U-bolts extend through a respective shackle, through the holes defined in respective horizontal leg sections of respective lower support end brackets, and through the holes defined in respective pairs of end bracket retainers, and are secured by nuts.

10. The supplemental suspension system according to claim 9, further comprising a plurality of pairs of end bracket spacers each having defined therein a pair of holes, and wherein the threaded ends of respective pairs of said U-bolts extend through a respective shackle, through the holes defined in respective pairs of end bracket spacers, through the holes defined in respective horizontal leg sections of respective lower support end brackets, and through the holes defined in respective pairs of end bracket retainers, and are secured by nuts.

11. The supplemental suspension system according to claim 2, further comprising a plurality of inclination plates through which the lower support member is mounted to respective leaf springs of the pair of leaf springs using mounting means.

12. The supplemental suspension system according to claim 11, wherein each inclination plate of the plurality of inclination plates comprises a bent rectangular plate having a top which is flat and extends horizontally, and which has defined therein a plurality of slots, and side legs which extend opposingly from the top, and wherein the first and second ends of the lower support member are mounted onto respective tops of the inclination plates.

13. The supplemental suspension system according to claim 12, wherein the lower support member has a cross-section which is I-beam shaped, wherein the lower support member comprises a longitudinal plate which supports the plurality of spring assemblies and which has a plurality of pairs of slots defined therein, and first and second longitudinal side plates which are rigidly fixed to the longitudinal plate, and wherein the longitudinal plate of the lower support member is mounted onto respective tops of the inclination plates.

14. The supplemental suspension system according to claim 13, wherein respective leaf springs of the pair of leaf springs are transversely mounted over respective ends of the rear axle of the vehicle using mounting means comprising a plurality of U-bolts having threaded ends and nuts, wherein the threaded ends of a pair of said U-bolts are inserted through respective slots of the plurality of slots defined in respective tops of respective inclination plates and through respective slots of the plurality of pairs of slots defined in the lower support members, and secured with respective nuts.

15. The supplemental suspension system according to claim 13, wherein respective leaf springs of the pair of leaf springs are transversely mounted over respective ends of the rear axle of the vehicle using mounting means comprising a plurality of square U-bolts having threaded ends, shackles, and nuts, wherein the lower support member is positioned over respective inclination plates, wherein a pair of said square U-bolts are positioned to extend over respective inclination plates and over the lower support member, and wherein the threaded ends of said pair of square U-bolts extend beneath respective leaf springs and are secured through respective shackles and respective nuts.

16. The supplemental suspension system according to claim 11, wherein cut-outs are provided in the first and second longitudinal side sections of the lower support member near the first and second ends thereof to accommodate respective inclination plates and, when present, in respective pairs of strongbacks near the first and second ends of the lower support member.

17. The supplemental suspension system according to claim 1, wherein the vehicle further comprises side frame members and a vehicle bed, wherein the supplemental suspension system further comprises an upper support member and a pair of Z-brackets attached to the ends of the upper support member, wherein the upper support member extends parallel to the rear axle, is positioned below the vehicle bed, and is fixedly attached to respective side frame members by respective ones of the pair of Z-brackets, and wherein the common central axis of respective spring assemblies is maintained by support from below by the lower support member and from above by the upper support member.

18. The supplemental suspension system according to claim 17, wherein the pair of Z-brackets each comprise upper and lower frame brackets which have defined therein a plurality of adjustment perforations including at least one of holes and slots, and which engage each other and are fixedly connected by attachment means, wherein respective lower frame brackets are fixedly mounted to respective side frame members of the vehicle, and wherein respective upper frame brackets are fixedly mounted to the upper support member so that the upper support member is held in place underneath the vehicle bed.

* * * * *